United States Patent [19]

Lambuth et al.

[11] 3,909,470
[45] Sept. 30, 1975

[54] THERMOSETTING ADHESIVE COMPOSITIONS EXTENDED WITH CELLULOSIC PAPER MILL SLUDGES

[75] Inventors: Alan L. Lambuth, Boise, Idaho; William Montgomery Hearon, Portland, Oreg.

[73] Assignee: Boise Cascade Corporation, Boise, Idaho

[22] Filed: Sept. 23, 1974

[21] Appl. No.: 508,226

Related U.S. Application Data

[62] Division of Ser. No. 406,002, Oct. 12, 1973.

[52] U.S. Cl. .................................. 260/17.3; 162/187
[51] Int. Cl.² .......................................... C08L 1/02
[58] Field of Search ................ 260/17.3, 17.2, 17.5; 162/187

[56] References Cited
OTHER PUBLICATIONS

Chem. Absts., Vol. 77: 63704t, "Utilization of Paper Sludge for Sheeting or Molding," Schueler.

Primary Examiner—Melvin Goldstein
Assistant Examiner—Edward Woodberry
Attorney, Agent, or Firm—Eugene D. Farley

[57] ABSTRACT

Thermosetting resinous adhesives, useful particularly as plywood or lumber laminating adhesives, comprise a phenol-, resorcinol-, urea-, or melamine-formaldehyde resin and an extender therefor. The extender comprises an aqueous cellulosic pulp used in relative proportions of from about 1–50 parts by weight extender for each 100 parts by weight resin, dry solids basis. Water is included in amount sufficient to impart to the compositions a viscosity of 1,000–12,000 centipoises. The cellulosic pulp extender preferably comprises the pulp mill paper making waste sludges containing the discarded cellulosic fines separated from the pulp products of the mill. Its inclusion has the effect of holding the water at the glue line and accordingly of improving significantly the assembly time characteristics of the adhesive.

13 Claims, No Drawings

THERMOSETTING ADHESIVE COMPOSITIONS EXTENDED WITH CELLULOSIC PAPER MILL SLUDGES

This is a division of application Ser. No. 406,002, filed 10-12-73

BACKGROUND OF THE INVENTION

This invention pertains to thermosetting resinous adhesives of use particularly as plywood and lumber-laminating adhesives.

The present invention concerns itself with both the wood-laminating and paper making industries.

In the wood laminating industry, specifically in the manufacture of plywood, wood veneers are coated with an aqueous thermosetting resinous adhesive and then assembled or laid up into plywood assemblies each comprising a plurality of veneers. A large number of these assemblies is stacked, pre-pressed, and then hot pressed to develop the adhesive bonds and form the finished plywood product.

Although the manufacture of plywood is a well established industry, a problem attending its use of the aqueous thermosetting resinous adhesives stems from the fact that when such adhesives are spread on wood, the water content of the adhesives tends to migrate into the porous structure of the wood. If such migration takes place to too great an extent before the adhesives set, the ability of the adhesives to develop strong bonds is severely diminished, or destroyed altogether. This effect in turn imposes a severe operating restriction on the use of the adhesives, since it obviously restricts the time available for assembling the veneers, stacking the assemblies and transferring them to the press. Accordingly, it is advantageous to have available adhesives characterized by retention of their water content at the glue line for a substantial period of time, i.e. for long "assembly times".

In the paper making industry, it is routine practice to reduce wood to chips, and to pulp the chips by either chemical or mechanical procedures. In chemical pulping the wood lignin is dissolved and a cellulosic fiber product obtained which is converted to paper. In mechanical pulping, the wood is reduced mechanically to the form of small lignocellulosic pieces which are the subject matter of the paper making operation.

In both procedures, the cellulosic content of the wood is highly refined by beating or abrading in the presence of water. This has the well known effect of fibrillating the cellulosic fibers and hydrating them so that they contain a large proportion of water.

During the paper making operation there is produced a large quantity of "white water" which contains a substantial proportion of fines, i.e. of cellulosic particles so short that they pass through the forming wire. After processing the white water to recover the fiber fraction of longer fiber length, there remains a fines residue which is not suitable for paper making and comprises a waste product of little value.

The present invention is predicated upon the discovery that hydrated cellulosic particles, and in particular those contained in paper making pulp mill sludges, have inherent properties which make them highly useful as extenders for thermosetting resinous adhesives in the manufacture of plywood and other glues. In particular, the cellulosic particles have a high content of water bound to the cellulose in such a fashion that is is not readily released.

Accordingly, the hydrated cellulosic fibers, when included in resinous adhesives, hold the water content thereof and prevent its migration into porous wood surfaces when the adhesives are applied to the latter. This in turn imparts to the adhesives desirable assembly time characteristics which render the adhesives high superior in this important property.

Accordingly the present invention has for its objects the preparation of thermosetting resinous adhesive compositions which have exceptionally long assembly time properties, which are stable in storage, which are versatile in their application to the manufacture of both plywood and laminated lumber products and which possess a relatively high water content at given working viscosities, thus enabling using resinous adhesives having a reduced resin solids content without loss of performance.

Another object of the invention is the provision of thermosetting resinous adhesive compositions which are relatively easy to prepare and which, in contradistinction to the manufacture of resinous adhesives using other cellulosic extenders, do not require digestion in order to develop suitable rheological properties in the extender.

Still a further object of this invention is the provision of an extender for themosetting resinous adhesives which can be used with a wide spectrum of synthetic resins of both acid and alkaline types, in the production of glues having pH values varying over a wide range, as required to produce glues suitable for use in a wide variety of industrial applications.

SUMMARY OF THE INVENTION

The thermosetting resinous adhesive compositions of the present invention comprise at least one thermosetting resin and an extender for the resin comprising an aqueous cellulosic pulp hydrated to a freeness of not over 400 cc. C.S.F. (Canadian Standard Freeness identified hereinafter and having a content of cellulosic fibers a preponderant proportion of which have maximum lengths of not over about ⅛ inch, preferably not over about 1/16 inch. Water is included in the compositions in amount sufficient to impart thereto a viscosity of from about 1,000 to about 12,000 centipoises.

The measure of pulp freeness is identified herein as Canadian Standard Freeness (C.S.F.). It is determined by an empirical test procedure which gives an arbitrary measure of the rate at which a suspension of three grams of pulp in one liter of water may be drained. The test procedures in detailed in TAPPI STANDARD TEST METHOD T 227M-58--.

The thermosetting resins which may be employed in the formulation of the adhesives comprise the thermosetting phenol-, phenol-resorcinol-, resorcinol-, urea-, and melamine-formaldehyde resins. The resins and extender are used in relative proportions of from about 1 to about 50, preferably from about 3 to about 30 parts by weight extender for each 100 parts by weight resin, dry solids basis.

In the preparation of the adhesives, the foregoing constituents are simply mixed together, without the necessity of including a separate digestion step, into adhesive products which when applied to porous surfaces such as wood, and by virtue of the hydrated character of their content of cellulosic pulp extender, retain the water on the glue line for assembly times of 45 minutes or more, thereby materially increasing the facility with which the adhesives may be employed in the manufacture of plywood and other products.

DESCRIPTION OF DETAILED EMBODIMENTS

As noted above, the thermosetting resinous adhesive compositions of the invention comprise 1–50, preferably 3–30 parts by weight of hydrated cellulosic pulp extender for each 100 parts by weight thermosetting resin, dry solids basis. Sufficient water is included to provide in the finished adhesive compositions a working or glue spreading viscosity of from about 1,000 to 12,000 centipoises.

With respect to the thermosetting resin, it is a particular feature of the invention that it is applicable to the use of a wide range of such resins. The useful resins fall into three principal classes: The highly alkaline resins, having a pH of from 10 to 13; the moderately alkaline resins having a pH of 8 to 10; and the substantially neutral or slightly acidic resins having a pH of from 5 to 8.

The resins of the first class comprise the resinous condensation products of phenol and formaldehyde; those of the second class comprise the resinous condensation products of resorcinol and formaldehyde, and in particular the resinous condensation products of a phenol-resorcinol mixture and formaldehyde, the mixture containing less than about 50% by weight phenol; those of the third class comprise the aminoplasts, in particular the resinous condensation products of urea and formaldehyde and melamine and formaldehyde.

Such thermosetting resins are readily available as resinous products, useful in the formulation of plywood and lumber laminating glues. They have the above indicated pH values and a solids content usually falling within the broad range of from 35–65% by weight, dry solids basis.

The foregoing resins are well known and are used with well known catalysts, the working content of which is included in the adhesive formulations set forth above.

Thus the highly alkaline phenol-formaldehyde resins are catalyzed by the presence of alkali, usually by the addition of caustic soda.

The mildly alkaline resorcinol formaldehyde and phenol-resorcinol formaldehyde resins are hardened by the presence of aldehyde donors such as liquid formaldehyde, paraformaldehyde and resins containing excess formaldehyde or methylol functionality.

The substantially neutral or weakly acid resins require acid catalysts. Representative are ammonium chloride, aluminum sulfate and citric acid used in amount of from 0.3 to 3% by weight, based on the weight of the resin solids.

The hydrated cellulosic pulp extender for the resin, which comprises another major constitutent of the hereindescribed thermosetting resinous adhesives, may be derived from a wide variety of lignocellulosic or woody sources. Although it may be derived from annual plants such as grasses, straw, corn stalks, corn cobs and the like, it preferably is derived from the woods of various species of trees, both hardwood and softwood. In particular, it may be derived from the woods of the trees conventionally employed in the manufacture of papermaking pulps, for example western hemlock, Douglas fir, jack pine, loblolly pine, spruce and aspen.

These and other lignocellulosic materials are prepared for the purposes of the invention by pulping them by any of the conventional commerically employed procedures, either chemical or mechanical, used for the manufacture of papermaking pulps. Thus they may be produced in the form of a full chemical pulp resulting from the application of conventional sulfite, Kraft, or soda pulping procedures, followed by refining in conventional refiners such as the Jordan, Claflin, Bauer, Morden and Disco refiners.

In addition, they may comprise mechanical pulps, such as newsprint furnish produced by grinding lignocellulose on pulping stones or in refiners. If desired, mixtures of chemical and mechanical papermaking pulps may be employed.

As is well known, the pulping and the refining procedures not only reduce the woody materials to the form of fibers or small particles, they also acheive the hydration of the cellulosic material. This effect includes the fibrillation of the fibers and their swelling with substantial amounts of hydrating water.

The amount of hydration of the cellulosic pulp which should be ahcieved to suit the purposes of the present invention is widely variable. In general, any degree of hydration is beneficial, since it creates a pulp which when included in the glue mix holds the water, keeps it on the glue line, and prevents it from migrating into porous wood surfaces thereby increasing the assembly time of the glue.

Practically speaking, the degree of hydration should be equal to that produced in a cellulosic pulp by processing in a commercial papermaking refiner. Since the degree of hydration of the pulp determines at least in part its freeness, the freeness values of the pulp may be used to define the degree of hydration. For present purposes, the pulp should have a freeness of not over 400 cc. C.S.F.

In addition to providing a hydrated cellulosic pulp, it is important for present purposes to provide one in which the cellulosic fibers or particles do not exceed a certain length. If a major proportion of the fibers, e.g. more than about 10% by weight thereof, have a length of more than ⅛ inches, they interfere with the application of the adhesives in which they are incorporated. Specifically, in the case of plywood adhesives, they tend to aggregate in spreader hoppers and spray orifices and form in effect a multiplicity of filtering units which filter out and involve the short fibers and thus clog the equipment. Accordingly, the cellulosic fibers or particles should have maximum lengths of about ⅛ inch. A preferred maximum length is about 1/16 inch.

It is apparent from the foregoing that the hydrated cellulosic pulp which is useful in the hereindescribed adhesive compositions may be derived in several manners. If desired, it may be made by pulping raw chips specifically for the purpose of producing a pulp for use in the adhesive compositions. Alternatively, the various commerical pulps may be diverted from a papermaking purpose and applied to the purpose of formulating the adhesive compositions.

Principally and preferably, however, the pulps may be derived from the waste sludges produced as a necessary byproduct of paper manufacture. As noted, such sludges are produced in very large quantilies such that their disposal may be a problem. Consequently they are of very low cost and their application to a useful commercial purpose such as the formulation of plywood glues would be of substantial economic benefit to the paper mill.

Pulp mill papermaking waste sludges are obtained principally from the white water which is recovered from the forming wire of the paper machine. They also may be derived, however, from the waste liquors of the bleach plant or other processing units of the mill.

All of these effluents conventionally are consolidated and processed together. Their compositions accordingly are quite heterogenous.

Thus, in addition to cellulosic fibers, the sludges may contain large amounts of paper fillers including clay, titanium dioxide and calcium carbonate. They also may contain preservatives, wetting agents, starch, sizes, flocculating agents, pigments and organic dyes.

Substantial amounts of such non-cellulosic components may be present. Thus a typical pulp mill sludge may contain from 0 to 60% by weight, dry solids basis, of such extraneous solid materials and be suitable for the present purposes. However, it should not contain more than about 75% by weight thereof.

It is to be noted that the extraneous solid components of the sludges contribute little or nothing to the water-holding properties of the glue. Neither do they interfere appreciably with the water-holding properties of the hydrated cellulosic pulp component of the sludges. They are present merely as bulk fillers, the presence of which neither adds nor detracts substantially from the properties of the glue as long as the glue contains adequate amounts of the active ingredients, i.e. of thermosetting resin adhesive and hydrated cellulosic pulp filler.

Typically to prepare a sludge suitable for the purposes intended herein, the white water from the forming wire, or aqueous sludge residues from other papermill sources are led to a conventional clarifier or settling tank. Here the white water is permitted to settle, and the supernatent liquor is drawn off, leaving a sludge containing 2–3% by weight solids. This is passed through a processing unit such as a DSM screen, or other separator which separates any remaining useful papermaking fibers from the sludge. The liquor from the screen, which may contain as little as 1% by weight solids, is passed through a second clarifier which concentrates the solids to about 7% by weight. These solids then are passed through a dewatering device such as a filter press which presses out excess water, leaving a slush or semi-solid containing from 15–75% sludge solids.

For the present purposes, the degree of concentration of such solids should be such as to provide them in a useful concentration for formulation of the adhesives. However, if they are concentrated to a level of more than about 75% by weight solids, they become difficult to disperse in the liquid glues.

If the pulp mill sludge contains an unduly large proportion of fibers having a length greater than ⅛ inch, it is desirable to process the sludge to adjust the proportion of long fibers to within acceptable limits, i.e. less than 10% by weight. Because of the swollen, hydrated character of the material, it is not feasible, or at least not practical, to achieve this result by a simple screening operation. Accordingly, it is achieved by passing the sludge through a fiber recovering device such as a "DSM" screen which effectuates a selective separation of the longer fibers. In the alternative, it may be achieved by passing the sludge through a papermaking pulp refiner of the conventional classes listed above as many times as is necessary to reduce the fiber lengths to acceptable values.

In addition to the thermosetting resin and the hydrated cellulosic pulp components, the hereindescribed thermosetting resinous adhesive compositions may include suitable amounts of various supplemental materials. Such materials comprise, for example, the conventional glue additives such as defoamers, colorants, tackifiers, etc. In particular, they often may include to advantage a suitable proportion of wheat flour or other amylaceous material as a tackifier.

Still further, the adhesives of our invention include water in amount sufficient to impart to the final adhesive compositions viscosities suitable for spreading and for establishing the desired glue line between the veneers or lumber pieces to be glued together. The amount of water added for these purposes is widely variable, as determined by the intended use of the glue, the substrate to which it is to be applied, the physical conditions of application, and the identity of the other components. In general, a suitable viscosity for the resinous adhesive lies within the broad range from about 1,000 to about 12,000 centipoises, as determined in a conventional viscosimeter, for example a Brookfield viscosimeter operating at 25°C. and 20 rpm.

It is a particular feature of the present invention that the resinous adhesive compositions which are its subject matter are prepared easily and quickly using a minimum of equipment. Thus, in contradistinction to compositions including FURAFIL extenders comprising the residue remaining after the acid hydrolysis of oat hulls and corn cobs, a separate treatment with alkali is not necessary in order to develop appropriate rheological properties in the extender. All that is required is to mix in the extender, preferably at the time of making the glue, using a high shear or counter-rotating mixer of high capacity and efficiency. A stable adhesive results which, as noted, may be applied to advantage in the fabrication of plywood, laminated beams and other glued products.

The adhesive products of the invention are illustrated by the following examples wherein parts are expressed as parts by weight on a dry solids basis, and wood failure values are given in per cent, 85% or better being an acceptable level in the tests employed.

The examples fall in three groups. Examples 1 to 5 illustrate the application of the dehydrated cellulosic pulp extenders of the invention to thermosetting resinous adhesives containing phenol-formaldehyde resins; example 6 illustrates the application of the extenders to adhesives containing phenol-resorcinol formaldehyde resins; and example 7 illustrates the application of the extenders to adhesives containing aminoplasts, specifically urea-formaldehyde resins.

EXAMPLE I

To test the adhesive capabilities of a typical phenol-formaldehyde resin-full chemical pulp mill cellulosic sludge of the invention, there was prepared a mixture of 1,000 grams of aqueous alkaline phenol-formaldenhyde resin, and 150 grams of papermill sulfite sludge. The resin (Monsanto PF 541) contained 41% resin solids and had a pH of 11.2. The sludge was a sulfite pulp sludge refined to a fiber length of at least 90% less than ⅛ inch by 15 passes through a Morden papermaking refiner. It contained 31% solids of which about 60% comprised cellulosic fibers.

The foregoing mixture was mixed until homogeneous. One hundred grams of water then was added and the mixing continued until a homogeneous mixture again was obtained. The mixing was carried out in a Hamilton Beach high speed mixer.

The resulting plywood glue contained 32% phenol-formaldehyde resin solids. Its pH was about 11.5. It was spread in an amount of 60 pounds MDGL on Douglas fir plywood veneers which then were laid up into three-ply assemblies using assembly times varying between 3 minutes and 45 minutes. The assemblies were pressed for 2½ minutes at 285°F. and 200 psi.

The resulting 5/16 inch plywood panels then were subjected to the standard American Plywood Association vacuum pressure test for glue bond strength as measured by wood failure on shear. As indicated in the test data given below, all samples passed the test with significantly high values of wood failure, even at the extreme limits of assembly time.

| Assembly Time (Min.) | Average of 10 Panels | |
|---|---|---|
| | Load (PSI) | Wood Failure (%) |
| 3 | 260 | 93 |
| 15 | 110 | 100 |
| 30 | 140 | 99 |
| 45 | 130 | 100 |
| Average at 4 assembly times | 173 | 98 |

EXAMPLE II

The procedure of Example I was followed, but using a somewhat less advanced phenol-formaldehyde resin, i.e. Monsanto PF 544 containing 41% resin solids, dry solids basis, and having a pH of 11. The same sulfite-full chemical sludge was employed as in Example I, but at a solids content of 32%. The sludge was refined by ten passes through a Morden papermaking refiner.

The results were as follows:

| Assembly Time (Min.) | Average of 10 Panels | |
|---|---|---|
| | Load (PSI) | Wood Failure (%) |
| 3 | 150 | 88 |
| 15 | 285 | 92 |
| 30 | 170 | 98 |
| 45 | 240 | 95 |
| Average at 4 assembly times | 211 | 93 |

EXAMPLE III

This example illustrates the application to the formulation of the adhesives of the invention of another commercial phenolformaldehyde resin, (Borden's Cascophen W166), in sharply reduced amount.

The procedure of Example I was repeated, employing 1,000 grams of the resin, 500 grams of full chemical bleached kraft pulp, and 270 grams of water. Mixing was accomplished in a Cowles dissolver. The phenol-formaldehyde resin had a solids content of 41% and a pH of 11.5.

The sludge was separated in a DSM papermaking fiber separator to a concentration of fines having a content of about 90% cellulosic fibers less than 1/16 inch long. The refined sludge contained 28% solids, of which about 50% by weight comprised clay. The final glue contained only 22.6% phenol-formaldehyde resin solids, dry solids basis.

The glue was applied to wood veneers which were laid up into plywood assemblies, pressed and tested as set forth in Example I except that the glue spread was 65–70 pounds MDGL and the press time was 3 minutes. The test applied was American Plywood Association's standard plywood dry shear test.

| Assembly Time (Min.) | Average of 10 Panels | |
|---|---|---|
| | Load (PSI) | Wood Failure (%) |
| 3 | 235 | 100 |
| 15 | 290 | 90 |
| 30 | 315 | 83 |
| 45 | 215 | 100 |
| Average at 4 assembly times | 264 | 93 |

EXAMPLE IV

This example illustrates the application in the adhesives of the invention of phenol-formaldehyde resin of particularly high alkalinity.

The procedure of Example I was repeated using 1500 grams of phenol-formaldehyde liquid resin, 350 grams of pulpmill sludge and 250 grams of water. The resin (Borden's Cascophen W156-V) was highly advanced, contained 41% resin solids, and had a pH of 12. The pulp sludge was predominantly a bleached kraft sludge, refined by four passes through a Jordan refiner to a C.S.F. freeness of 85cc. It contained 30% solids of which 65% comprised Douglas fir and Ponderosa pine cellulosic fibers having a fiber length of about 1/16 inch or less.

The resultant adhesive was applied in spreads of 67–68 pounds MDGL to 1/8 inch mixed Western soft wood veneers which were laid up into five ply plywood assemblies. The assemblies were pressed 5 minutes at 300°F. and 175 PSI after which the plywood panels were tested for wood failure by the American Plywood Association standard vacuum pressure test. The results are given below:

| Assembly Time (Min.) | Average of 10 Panels | |
|---|---|---|
| | Load (PSI) | Wood Failure (%) |
| 3 | 240 | 100 |
| 10 | 165 | 96 |
| 20 | 180 | 78 |
| 30 | 250 | 91 |
| Average at 4 assembly times | 209 | 91 |

EXAMPLE V

This group of tests illustrates the application of yet another phenol-formaldehyde resin together with various cellulosic pulp sludges and an amylaceous tackifier in the formulation of the hereindescribed compositions. The following plywood glues were formulated:

Glue No. 1

2000 gm. Phenol-formaldehyde Resin
    475 gm. Water 375 gm. Cellulosic Pulp Sludge (Jordan-refined, 4-pass, 30% solids)
  Mix 5 minutes
100 gm. Wheat Flour
  Mix 3 minutes
75 gm. 50% Sodium Hydroxide
  Mix 10 minutes
2 gm. Borax
  Mix 5 minutes
Immediate Viscosity 7500 cps at 81°F. 28.5% Resin solids Glue No. 2
1500 gm. Phenol-formaldehyde Resin
100 gm. Water
400 gm. Cellulosic sludge (17% solids)
  Mix 5 minutes
50 gm. Wheat Flour
  Mix 3 minutes
50 gm. 50% Sodium Hydroxide
  Mix 10 minutes
Immediate Viscosity 6000 cps at 81°F. 30.7% Resin Solids Glue No. 3
1500 gm. Phenol-formaldehyde Resin
150 gm. Water
400 gm. Cellulosic Pulp Sludge (16.5% Solids)
  Mix 5 minutes
50 gm. Wheat Flour
  Mix 3 minutes
50 gm. 50% Sodium Hydroxide
  Mix 10 minutes
Immediate Viscosity 11,250 cps at 79°F. 30% Resin Solids Glue No. 4
1500 gm. Phenol-formaldehyde Resin
400 gm. Cellulosic Pulp Sludge
  Mix until homogeneous
34% Resin Solids In all of Glues No. 1, 2, 3 and 4 the same phenol-formaldehyde resin was used, i.e. Pacific Resins AMRES 5581, having a resin solids of 43% and a pH of 11.5. The mixing in all cases was carried out in a laboratory model Dispersator high shear mixer.

In Glue No. 1 the same full chemical bleached kraft pulp was employed as was employed in Example IV. In Glue No. 2 there was employed a clarifier sludge comprising approximately 75% Western hemlock groundwood and 25% mixed Western woods kraft pulp, no filler being present. It had a C.S.F. freeness of 100 cc.

In Glues No. 3 and 4 the cellulosic sludge was of the same source as Glue No. 2, but comprised a Saveall sludge, i.e. one from which the longer fibers had been separated and recycled and the fines accordingly concentrated. It had a C.S.F. freeness of 265 cc.

All of the foregoing plywood adhesives were applied to the production of test samples of plywood by spreading them on Douglas fir veneers in spreads of from 65–68 pounds MDGL. The coated veneers were laid up into three ply assemblies which were pressed at various assembly times using a pre-cure time of 30 seconds, a press time of 2½ minutes, a temperature of 285°F. and a pressure of 175 psi.

The resulting panels then were tested for wood failure by the American Plywood Association's standard vacuum pressure test with results as follows:

Glue No. 1

| Assembly Time (Min.) | Average of 10 Panels | |
|---|---|---|
| | Load (PSI) | Wood Failure (%) |
| 10 | 300 | 90 |
| 20 | 275 | 95 |
| 30 | 280 | 92 |
| 40 | 240 | 94 |

Glue No. 2

| Assembly Time (Min.) | Average of 10 Panels | |
|---|---|---|
| | Load (PSI) | Wood Failure (%) |
| 3 | 315 | 89 |
| 10 | 320 | 100 |
| 20 | 250 | 97 |
| 30 | 270 | 98 |
| 40 | 265 | 92 |

Glue No. 3

| Assembly Time (Min.) | Average of 10 Panels | |
|---|---|---|
| | Load (PSI) | Wood Failure (%) |
| 3 | 310 | 82 |
| 10 | 325 | 91 |
| 20 | 275 | 97 |
| 30 | 305 | 97 |
| 40 | 305 | 96 |

Glue No. 4

| Assembly Time (Min.) | Average of 10 Panels | |
|---|---|---|
| | Load (PSI) | Wood Failure (%) |
| 3 | 285 | 96 |
| 10 | 255 | 100 |
| 20 | 275 | 99 |
| 30 | 150 | 100 |
| 40 | 280 | 95 |

It is apparent from the test results on Glues No. 1, 2 and 3 that the cellulosic pulp extenders are compatible and useful with conventional tackifiers for phenolic resin adhesives, such as wheat flour. Glue No. 2 indicates the applicability of the invention to the use of groundwood sludges derived from the clarifier with the fines unconcentrated.

Glue No. 3 illustrates the applicability of the invention to the use of groundwood sludges in concentrated form, such as are derived from paper mill Saveall units. Glue No. 4 illustrates the satisfactory application of such sludges in the absence of an extraneous tackifier.

EXAMPLE VI

This group of tests illustrates the use of cellulosic pulp sludges as extenders for the mildly alkaline phenol-resorcinolformaldehyde resins in the manufacture of adhesive compositions useful, for example, in laminating lumber.

The following formulations were prepared, using various phenol-resorcinol-formaldehyde resins and cellulosic pulp sludges obtained from various sources:

GLUE NO. 1

100 gm. Phenol-resorcinol-formaldehyde resin Monsanto "PRF 2915"    Immediate Viscosity 3370 cps 12.5 gm. Cellulosic Pulp Sludge
  Mix until smooth
7.5 gm. Paraformaldehyde Catalyst
  Mix until smooth 15 Minute Viscosity 3550 cps
Gel Time 30 Minutes

GLUE NO. 2

100 gm. Phenol-resorcinol-formaldehyde resin Monsanto "PRF 2915"    Immediate Viscosity 3150 cps -Continued
GLUE NO. 2

| | 20 Minute Viscosity |
|---|---|
| 5 gm. Cellulosic Pulp Sludge<br>Mix until smooth | 3400 cps<br>Gel Time 29 Minutes |
| 7.5 gm. Paraformaldehyde catalyst<br>Mix until smooth | |

GLUE NO. 3 (Control)

| 100 gm. Phenol-resorcinol-<br>formaldehyde resin<br>Monsanto "PRF 2915" | Immediate Viscosity<br>2710 cps |
|---|---|
| | 15 Minute Viscosity |
| 20 gm. Paraformaldehyde Catalyst<br>Monsanto "2915 F"<br>ca. 50% by weight paraformaldehyde<br>and 50% by weight wood flour<br>Mix until smooth | 2900 cps<br><br>Gel Time 33 Minutes |

GLUE NO. 4

| 100 gm. Phenol-resorcinol-<br>formaldehyde resin<br>Monsanto "M4-29" | Immediate Viscosity<br>2750 cps |
|---|---|
| | 15 Minute Viscosity |
| 10 gm. Cellulosic Pulp Sludge<br>Mix until smooth | 2800 cps |
| 7 gm. Paraformaldehyde catalyst<br>Mix until smooth | |

GLUE NO. 5 (Control)

| 100 gm. Phenol-resorcinol-<br>formaldehyde resin<br>Monsanto "M4-29" | Immediate Viscosity<br>2300 cps |
|---|---|
| | 15 Minute Viscosity |
| 17 gm. Paraformaldehyde Catalyst<br>Monsanto "M4-28"<br>Mix until smooth | 2400 cps<br><br>Gel Time 28 Minutes |

GLUE NO. 6

| 100 gm. Phenol-resorcinol-<br>formaldehyde resin<br>Borden "Cascophen LT75" | Immediate Viscosity<br>2700 cps<br>45 Minute Viscosity |
|---|---|
| 12.5 gm. Cellulosic Pulp Sludge<br>Mix until smooth | 3420 cps<br>Gel time 24 Minutes |
| 7.5 gm. Paraformaldehyde Catalyst<br>Mix until smooth | |

GLUE NO. 6

| 100 gm. Phenol-resorcinol-<br>formaldehyde resin<br>Borden "Cascophen LT75" | Immediate Viscosity<br>3750 cps |
|---|---|
| 7.5 gm. Cellulosic Pulp Sludge<br>Mix until smooth | 25 Minute Viscosity<br>3720 cps |
| 7 gm. 100-mesh Paraformaldehyde<br>Catalyst<br>Mix until smooth | Gel Time 26 Minutes<br>Glue pH 9.0 |

GLUE NO. 8 (Control)

| 100 gm. Phenol-resorcinol-<br>formaldehyde resin<br>Borden "Cascophen LT75" | Immediate Viscosity<br>4440 cps |
|---|---|
| | 15 minute viscosity |
| 15 gm. Paraformaldehyde Catalyst<br>Borden "FM282" | 4000 cps |
| | Gel Time 50 Minutes |
| Mix until smooth | Glue pH 9.0 |

In formulating the above adhesive compositions, all viscosities were measured at 25°C. using a Brookfield Viscosimeter, No. 4 spindle at 20 rpm. All gel times were determined in a 110°F. circulating water bath according to standard test procedures and endpoint.

The cellulosic pulp sludge employed in Glue No. 1 was a Saveall sludge consisting of about 75% by weight groundwood and 25% by weight kraft having a solids content of 16.4 and a pH of 4.2. Those employed in glues No. 2 and 7 were Jordan refined (4-pass) kraft pulps having a solids content of 29.4 and a pH of 5.2. That employed in Glue No. 4 comprised screened clarifier sulfite sludge having a solids content of 32% and a pH of 6.8. That employed in Glue No. 6 comprised unrefined clarifier mixed groundwood and kraft sludge having a solids content of 20% and a pH of 6.

Glues No. 3, 5 and 8 contained no sludge, being controls for resins Monsanto PRF 2915, Monsanto M 4-29, and Borden Cascophen LT75, respectively.

The phenol-resorcinol-formaldehyde resins had the following properties:

| Type | Viscosity * | Solids | pH |
|---|---|---|---|
| Monsanto "PRF 2915" | 350 cps | 50% | 8.8 |
| Monsanto "M4–29" | 245 cps | 50% | 9.2 |
| Borden "Cascophen LT 75" | 210 cps | 50% | 9.0 |

* Measured at 77°F. (25°C) by Brookfield (20 rpm, No. 4 spindle)

All three of the above commercial phenol-resorcinol-formaldehyde resins contained phenol and resorcinol in the proportion of from 40–50% of the phenol to 50–60% resorcinol, by weight, dry solids basis.

The foregoing glue samples then were subjected to tests of primary interest in evaluating adhesives to be used in gluing up wood laminates: An adhesive "sag" test, and an adhesion test consisting of the American Institute of Timer Construction (AITC) test No. 110, a variation of the ASTM D-1101-65 cyclic delamination test.

The sag test provides a method of determining the capability of the glue to remain in place on a vertical surface when extruded from orifices of graduated sizes without pulling itself into beads or granules by surface tension or dripping (running) from the applied line of glue. The larger the orifice in which the glue remains in place, the better its consistency and performance for lumber laminating and the more uniform the glue coverage when pressure is applied. It is of particular significance, since lumber laminates conventionally are laid up on edge with the glue films vertical, and accordingly subject to running.

The glue samples of this example were subjected to the above sag test using orifices of 1/32 inch, 3/64 inch, 2/32 inch, 3/32 inch, 4/32 inch and 5/32 inch. All of the fully formulated glues, i.e. glues 1, 2, 4, 6 and 7 passed the sag test satisfactorily, there being no runs when extruded from orifices up to and including 3/32 inch in diameter.

It is of particular interest that control glue No. 3 which contained no cellulosic pulp extender, but rather contained via the catalyst a conventional wood flour extender, performed poorly and demonstrated substantial running with the smaller orifices.

Next lumber laminates were laid up using all eight of the test glues under the following conditions:

Glue age: 30 to 45 minutes
Glue spread: 80 lbs/MSGL
Stock: 1½-inch vertical grain Douglas fir, S4S, 7–8% MC.
Clamp time: 24 hrs. at 80°–85°F.
Pressure: 100 psi.

All eight of the samples satisfactorily passed the conventional cleavage test, showing wood failures of from 95–100% when knifed at all combinations of both open and closed assembly times, at 85°F. They also passed the AITC 110 cyclic delamination test, one cycle of which is accepted as satisfactory exterior adhesive performance for laminated lumber products.

EXAMPLE VII

This Example illustrates the application of the hereindescribed cellulosic pulp extenders to urea-formaldehyde resinous adhesive mixes.

A series of glue samples was prepared using various cellulosic pulp sludges in conjunction with a thermosetting urea-formaldehyde resin. The formulations and the manner in which they were prepared were as follows:

GLUE NO. 1 (Control)

| | |
|---|---|
| 200 gm. Urea-formaldehyde Resin | Glue pH 6.2 |
| 260 gm. Water  Mix until smooth | Immediate Viscosity 3400 cps  6 hour Viscosity 3000 cps |
| 200 gm. Soft Wheat Flour  Mix until smooth | Resin Solids 19.4% |
| 10 gm. Catalyst Solution  Mix until smooth | |

GLUE No. 2

| | |
|---|---|
| 200 gm. Urea-formaldehyde Resin | Glue pH 5.8 |
| 125 gm. Water  Mix until smooth | Immediate Viscosity 9150 cps  1 hour Viscosity 9850 cps  (6000 cps with helical path) |
| 100 gm. Cellulosic pulp sludge: 75% groundwood, 25% kraft  Mix until smooth | 6 hours Viscosity 9950 cps  Resin Solids 29.9% |
| 10 gm. Catalyst Solution  Mix until smooth | |

GLUE NO. 3

| | |
|---|---|
| 200 gm. Urea-formaldehyde Resin | Glue pH 6.1 |
| 230 gm. Water  Mix until smooth | Immediate Viscosity 4600 cps  1 hour Viscosity 4300 cps |
| 160 gm. Cellulosic pulp sludge: kraft  Mix until smooth | 4 hour Viscosity 4220 cps  Resin Solids 20.3% |
| 40 gm. Soft Wheat Flour  Mix until smooth | |
| 10 gm. Catalyst solution  Mix until smooth | |

GLUE NO. 4

| | |
|---|---|
| 200 gm. Urea-formaldehyde Resin | Glue pH 5.9 |
| 30 gm. Cellulosic Pulp Sludge: ca 50% groundwood, 50% kraft  Mix until smooth | Immediate Viscosity 3350  1 hour Viscosity 3620 cps  2 hour Viscosity 3670 cps |
| 10 gm. Catalyst Solution  Mix until smooth | Resin Solids 54.2% |

In all of the above formulations, the urea-formaldehyde resin was Borden "Casco 5 H" having 65% solids, a viscosity at 77°F. of 810 centipoises and a pH of 7.0. The catalyst comprised, in per cent by weight, 35% ammonium hydroxide, 15% ammonium chloride and 50% water. The mixing apparatus was a DISPERSATOR high shear impeller mixer. All glue viscosities were measured at 77°F. on a Brookfield viscosimeter using a No. 4 spindle at 20 rpm after 30 seconds of rotation.

All of the foregoing glues were applied to the manufacture of plywood under the following gluing conditions:

Panel Construction - Three plies of 1/10 inch Spruce veneer
Glue Spread - 75 to 80 lbs/MDGL for Glues 1 through 4 45 to 50 lbs/MDGL for Glue 5
Assembly Times - 3 to 120 minutes
Press Time - 3 minutes
Press Temperature - 260°F.
Platen Pressure - 175 psi
Precure - 30 seconds.

The plywood panels thus produced were subjected to the conventional knife test for plywood bonds and the standard American Plywood Association adhesive failure test for interior plywood. The knife test comprises a visual estimate of wood failure on each glue line after knifing. The adhesive failure test comprises a 100°F. vacuumsoak, oven dry test wherein delamination of the plies indicates adhesive failure.

All of the sample glues passed both the knife test and the adhesive failure test, indicating their suitability for use as interior plywood glues.

Having thus described our invention in preferred embodiments, we claim as new and desire to protect by letters patent:

1. A thermosetting resinous adhesive composition comprising:
   a. at least one thermosetting resin of the class consisting of the thermosetting ureaformaldehyde resins, and melamine-formaldehyde resins,
   b. an extender for the resin comprising an aqueous cellulosic pulp hydrated to a freeness of not over 400 cc. Canadian Standard Freeness and having a content of cellulosic fibers a preponderant proportion of which have maximum lengths of not over about ⅛ inch,
   c. the resin and extender being used in relative proportions of from about one to about fifty parts extender for each one hundred parts resin, parts being expressed as parts by weight on a dry solids basis, and
   d. water used in amount sufficient to impart to the composition a viscosity of from about 1,000 to about 12,000 centipoises.

2. The adhesive composition of claim 1 wherein the thermosetting resin consists essentially of a urea formaldehyde resin.

3. The adhesive composition of claim 1 wherein the thermosetting resin consists essentially of a melamine-formaldehyde resin.

4. The adhesive composition of claim 1 wherein the cellulosic pulp comprises a chemical pulp.

5. The adhesive composition of claim 1 wherein the cellulosic pulp comprises a sulfite pulp.

6. The adhesive composition of claim 1 wherein the cellulosic pulp comprises a kraft pulp.

7. The adhesive composition of claim 1 wherein the cellulosic pulp comprises a soda pulp.

8. The adhesive composition of claim 1 wherein the cellulosic pulp comprises a mechanical pulp.

9. The adhesive composition of claim 1 wherein the cellulosic pulp comprises groundwood pulp.

10. The adhesive composition of claim 1 wherein the pulp comprises pulp mill papermaking waste sludge containing the discarded cellulosic fines separated from the papermaking pulp products of the mill.

11. The adhesive composition of claim 1 wherein the cellulosic fibers have maximum lengths of not over about 1/16 inch.

12. The adhesive composition of claim 1 wherein the resin and extender are used in relative proportions of from about 3 to about 30 parts extender for each 100 parts resin.

13. The adhesive composition of claim 1 wherein the resin consists essentially of a thermosetting urea-formaldehyde resin having a pH of 5–8, the pulp comprises pulp mill papermaking waste sludge containing the discarded cellulosic fines separated from papermaking pulp products of the mill, wherein at least 90% by weight of the fibers have maximum lengths of not over about 1/16 inch, and wherein the resin and extender are used in relative proportions of from about 3 to about 30 parts by weight, dry solids basis.

* * * * *